United States Patent
Tanaka et al.

(10) Patent No.: US 9,994,705 B2
(45) Date of Patent: *Jun. 12, 2018

(54) THERMOPLASTIC ELASTOMER COMPOSITION, MOLDED ARTICLE, AND ADHESIVE AGENT

(71) Applicants: KURARAY CO., LTD., Kurashiki-shi (JP); AMYRIS, INC., Emeryville, CA (US)

(72) Inventors: Yusuke Tanaka, Kamisu (JP); Hiromitsu Sasaki, Kamisu (JP); Shota Suzuki, Kamisu (JP); Yosuke Uehara, Kamisu (JP)

(73) Assignees: KURARAY CO., LTD., Kurashiki-shi (JP); AMYRIS, INC., Emeryville, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/103,218

(22) PCT Filed: Dec. 11, 2014

(86) PCT No.: PCT/JP2014/082793
§ 371 (c)(1),
(2) Date: Jun. 9, 2016

(87) PCT Pub. No.: WO2015/087955
PCT Pub. Date: Jun. 18, 2015

(65) Prior Publication Data
US 2016/0312023 A1     Oct. 27, 2016

(30) Foreign Application Priority Data
Dec. 11, 2013  (JP) .................. 2013-255861

(51) Int. Cl.
| C08L 53/02 | (2006.01) |
| C08F 297/04 | (2006.01) |
| C09J 123/26 | (2006.01) |
| C09J 153/02 | (2006.01) |
| C08L 23/26 | (2006.01) |
| C08F 8/46 | (2006.01) |

(52) U.S. Cl.
CPC ............. *C08L 53/025* (2013.01); *C08F 8/46* (2013.01); *C08F 297/04* (2013.01); *C08L 23/26* (2013.01); *C08L 53/02* (2013.01); *C09J 123/26* (2013.01); *C09J 153/02* (2013.01); *C09J 153/025* (2013.01); *C08L 2205/03* (2013.01); *C08L 2207/04* (2013.01)

(58) Field of Classification Search
CPC ......... C08L 23/12; C08L 53/025; C08L 23/04
See application file for complete search history.

(56) References Cited

U.S. PATENT DOCUMENTS

| 2002/0198327 A1* | 12/2002 | Chung ............... C08L 23/02 525/240 |
| 2009/0280318 A1* | 11/2009 | Matsugi ............... C08F 255/00 428/334 |
| 2010/0056714 A1 | 3/2010 | McPhee |
| 2010/0056743 A1 | 3/2010 | McPhee |
| 2010/0273012 A1* | 10/2010 | Moriguchi .......... C08L 23/0815 428/437 |
| 2012/0010370 A1 | 1/2012 | McPhee |
| 2012/0130033 A1 | 5/2012 | McPhee |
| 2012/0165474 A1 | 6/2012 | McPhee et al. |
| 2012/0244304 A1 | 9/2012 | McPhee |
| 2013/0123379 A1 | 5/2013 | McPhee |
| 2013/0196164 A1 | 8/2013 | Minamide et al. |
| 2016/0108228 A1 | 4/2016 | Sasaki et al. |

FOREIGN PATENT DOCUMENTS

| EP | 2 592 115 A1 | 5/2013 |
| EP | 2 980 153 A1 | 2/2016 |
| JP | 6-325005 A | 11/1994 |
| JP | 9-156035 A | 6/1997 |
| JP | 2014-237257 A | 12/2004 |
| JP | 2006-206715 A | 8/2006 |
| JP | 2006-291019 A | 10/2006 |
| JP | 2009-227844 A | 10/2009 |
| JP | 2010-1364 A | 1/2010 |
| JP | 2012-502135 A | 1/2012 |
| JP | 2012-502136 A | 1/2012 |
| JP | 2013-532767 A | 8/2013 |
| JP | 2014-195609 A | 10/2014 |
| JP | 2015-30854 A | 2/2015 |
| TW | 201345936 A | 11/2013 |
| WO | 2009/081877 A1 | 2/2009 |
| WO | WO 2010/027463 A1 | 3/2010 |

(Continued)

OTHER PUBLICATIONS

Extended European Search Report dated Jun. 9, 2017 in Patent Application No. 14869642.0.
International Search Report dated Mar. 3, 2015, in PCT/JP2014/082793 Filed Dec. 11, 2014.

*Primary Examiner* — Jeffrey C Mullis
(74) *Attorney, Agent, or Firm* — Oblon, McClelland, Maier & Neustadt, L.L.P.

(57) ABSTRACT

A thermoplastic elastomer composition comprising 100 parts by mass of a hydrogenated block copolymer (A) comprising a polymer block (a) consisting of a structural unit derived from an aromatic vinyl compound and a polymer block (b) comprising 1 to 100% by mass of a structural unit (b1) derived from farnesene and comprising 99 to 0% by mass of a structural unit (b2) derived from a conjugated diene other than farnesene, a mass ratio [(a)/(b)] of the polymer block (a) to the polymer block (b) being 1/99 to 70/30; and 5 to 300 parts by mass of a polar group-containing olefinic polymer (B), is excellent in flexibility and molding processability and capable of adhering to a ceramic, a metal, a synthetic resin, or the like even through a heat treatment at low temperatures (for example, 190° C. or lower) without requiring a primer treatment or the like.

17 Claims, No Drawings

(56) References Cited

FOREIGN PATENT DOCUMENTS

| WO | 2013/151068 A1 | 10/2013 |
| WO | 2013/151069 A1 | 10/2013 |
| WO | 2013/183570 A1 | 12/2013 |
| WO | 2014/156651 A1 | 10/2014 |

* cited by examiner

THERMOPLASTIC ELASTOMER COMPOSITION, MOLDED ARTICLE, AND ADHESIVE AGENT

TECHNICAL FIELD

The present invention relates to a thermoplastic elastomer composition containing a block copolymer constituted of a polymer block containing a structural unit derived from an aromatic vinyl compound and a polymer block containing a structural unit derived from farnesene, a molded article, and an adhesive.

BACKGROUND ART

Ceramics, metals, and synthetic resins which are excellent in durability, heat resistance, and mechanical strength are widely used for various applications of household electrical appliances, electronic parts, mechanical parts, automotive parts, and the like. There may be the case where these members are used upon being adhered or complexed with an elastomer member having excellent flexibility depending upon an application, a part constitution, a use method, and the like for the purpose of immobilizing on other structural members or purpose of impact absorption, breakage prevention, sealing, or the like.

As such an elastomer member, a styrene-based thermoplastic elastomer which is excellent in flexibility and dynamic properties, and further molding processability may be suitably used. The styrene-based thermoplastic elastomer as referred to herein refers to a block copolymer having a polymer block containing an aromatic vinyl compound unit and a polymer block containing a conjugated diene compound unit, or a hydrogenation product thereof.

However, since the styrene-based thermoplastic elastomer is a material with low polarity, it is not sufficient in adhesive force to ceramics, metals, or the like, so that there is involved such a problem that it is difficult to achieve melt adhesion as it is. For that reason, in order to allow the styrene-based thermoplastic elastomer to adhere to a ceramic or a metal, there are disclosed methods of applying an adhesive, or subjecting the surface of a ceramic, a metal, or a synthetic resin to a primer treatment in advance (see PTLs 1 to 6).

However, the methods disclosed in PTLs 1 to 6 involve such a problem that not only the process is complicated, but also the productivity is low, an that the production costs become high.

Against such a problem, there is disclosed a thermoplastic polymer composition including a styrene-based thermoplastic elastomer and polyvinyl acetal, the thermoplastic polymer composition having excellent adhesiveness to a ceramic, a metal, or a synthetic resin (see PTL 7). It is possible to allow this thermoplastic polymer composition to adhere to a ceramic, a metal, or a synthetic resin only through a heat treatment, without applying an adhesive or performing a primer treatment.

CITATION LIST

Patent Literature

PTL 1: JP 2006-291019A
PTL 2: JP 2006-206715A
PTL 3: JP 63-25005A
PTL 4: JP 9-156035A
PTL 5: JP 2009-227844A
PTL 6: JP 2010-1364A
PTL 7: WO 2009/081877A

SUMMARY OF INVENTION

Technical Problem

However, the thermoplastic polymer composition disclosed in PTL 7 is allowed to adhere after a heat treatment at high temperatures of 200° C. or higher (in particular, 240° C. or higher in the case of adhering to a ceramic or a metal) in a production process of a molded article adhered to a ceramic, a metal, or a synthetic resin. But, there was involved such a problem that since a large number of synthetic resin members are melted and deformed at high temperatures of 200° C. or higher, the synthetic resin members in the surroundings of the adhesive portions to be simultaneously heated are broken.

In addition, in an adhesive molded article between a thermoplastic elastomer and a base material, an adhesive which in a peel test, does not cause interfacial delamination but causes cohesive failure is considered excellent in performance as the adhesive. However, there may be the case where the thermoplastic polymer composition disclosed in PTL 7 causes interfacial delamination. Thus, a thermoplastic elastomer having a more excellent adhesive force, in which the fracture morphology is cohesive failure, has been demanded.

Under the foregoing circumstances, the present invention has been made, and its object is to provide a thermoplastic elastomer composition which is excellent in flexibility and molding processability and capable of adhering to a ceramic, a metal, a resin, or the like even through a heat treatment at low temperatures (for example, 190° C. or lower) without requiring a primer treatment or the like, in which in a peel test, the fracture morphology is cohesive failure, and which has a strong adhesive force, and also a molded article and an adhesive each including the same.

Solution to Problem

The present inventors made extensive and intensive investigations. As a result, it has been found that a thermoplastic elastomer composition including a specified hydrogenated block copolymer and a polar group-containing olefinic polymer is able to solve the foregoing problem, leading to the present invention.

Specifically, the gist of the present invention includes the following [1] to [3].

[1] A thermoplastic elastomer composition comprising 100 parts by mass of a hydrogenated block copolymer (A) comprising a polymer block (a) consisting of a structural unit derived from an aromatic vinyl compound and a polymer block (b) comprising 1 to 100% by mass of a structural unit (b1) derived from farnesene and comprising 99 to 0% by mass of a structural unit (b2) derived from a conjugated diene other than farnesene, a mass ratio [(a)/(b)] of the polymer block (a) to the polymer block (b) being 1/99 to 70/30; and 5 to 300 parts by mass of a polar group-containing olefinic polymer (B).

[2] An adhesive including the thermoplastic elastomer composition as set forth above in [1].

[3] A molded article including the thermoplastic elastomer composition as set forth above in [1].

Advantageous Effects of Invention

In accordance with the present invention, it is possible to provide a thermoplastic elastomer composition which is excellent in flexibility and molding processability and capable of adhering to a ceramic, a metal, a resin, or the like even through a heat treatment at low temperatures (for example, 190° C. or lower) without requiring a primer treatment or the like, in which in a peel test, the fracture morphology is cohesive failure, and which has a strong adhesive force, and also a molded article and an adhesive each including the same.

DESCRIPTION OF EMBODIMENTS

[1] Thermoplastic Elastomer Composition.

The thermoplastic elastomer composition of the present invention is a thermoplastic elastomer composition comprising 100 parts by mass of a hydrogenated block copolymer (A) comprising a polymer block (a) consisting of a structural unit derived from an aromatic vinyl compound and a polymer block (b) comprising 1 to 100% by mass of a structural unit (b1) derived, from farnesene and comprising 99 to 0% by mass of a structural unit (b2) derived from a conjugated diene other than farnesene, a mass ratio [(a)/(b)] of the polymer block (a) to the polymer block (b) being 1/99 to 70/30; and 5 to 300 parts by mass of a polar group-containing olefinic polymer (B).

[Hydrogenated Block Copolymer (A)]

The hydrogenated block copolymer (A) which is used for the thermoplastic elastomer composition of the present invention is a hydrogenation product (hereinafter sometimes referred to as "hydrogenated block copolymer (A)") of a block copolymer (hereinafter sometimes referred to as "block copolymer (P)") comprising a polymer block (a) consisting of a structural unit derived from an aromatic vinyl compound and a polymer block (b) comprising 1 to 100% by mass of a structural unit (b1) derived from farnesene and comprising 99 to 0% by mass of a structural unit (b2) derived from a conjugated diene other than farnesene, a mass ratio [(a)/(b)] of the polymer block (a) to the polymer block (b) being 1/99 to 70/30.

The thermoplastic elastomer composition of the present invention comprises the hydrogenated block copolymer (A) comprising the structural unit (b1) derived from farnesene in a specified content. Thus, as compared with styrene-based thermoplastic elastomers not containing a structural unit derived from farnesene, the thermoplastic elastomer composition of the present invention is excellent in flexibility and molding processability and capable of adhering to a ceramic, a metal, a resin, or the like even through a heat treatment at low temperatures (for example, 190° C. or lower) without requiring a primer treatment or the like, in which in a peel test, the fracture morphology is cohesive failure, and it has a strong adhesive force. In addition, its heat shrinkage factor after the heat treatment is small, so that the generation of a heat stress due to the heat treatment is suppressed, and the adhesive force becomes stronger.

The aforementioned polymer block (a) is constituted of a structural unit derived from an aromatic vinyl compound. Examples of such an aromatic vinyl compound include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, divinylbenzene, and the like. These aromatic vinyl compounds may be used solely or in combination of two or more thereof. Among those, styrene, α-methylstyrene, and 4-methylstyrene are more preferred, and styrene is still more preferred.

The aforementioned polymer block (b) comprises 1 to 100% by mass of a structural unit (1) derived from farnesene and 99 to 0% by mass of a structural unit (b2) derived from a conjugated diene other than farnesene. Although the structural unit (b1) may be a structural unit derived from either α-farnesene or β-farnesene represented by the following formula (I), it is preferably a structural unit derived from β-farnesene from the viewpoint of ease of production of the block copolymer (P). α-Farnesene and β-farnesene may be used in combination,

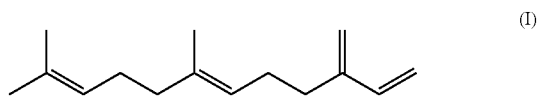

(I)

As for the structural unit (b2) derived from a conjugated diene other than farnesene, examples of the conjugated diene include butadiene, isoprene, 2-methyl-1,3-pentadiene, 1,3-hexadiene, 1,3-octadiene, 1,3-cyclohexadiene, 2-methyl-1,3-octadiene, 1,3,7-octatriene, myrcene, chloroprene, and the like. These may be used solely or in combination of two or more thereof. Among those, butadiene, isoprene, and myrcene are more preferred, and butadiene and/or isoprene is still more preferred.

The polymer block (b) comprises 1 to 100% by mass of the structural unit (b1) derived from farnesene and comprises 99 to 0% by mass of the structural unit (b2) derived from a conjugated diene other than farnesene. When the content of the structural unit (b1) derived from farnesene is less than 1% by mass, a thermoplastic elastomer composition which is excellent in flexibility and molding processability and capable of adhering to a ceramic or the like even through a heat treatment at low temperatures, in which in a peel test, the fracture morphology is cohesive failure, and which has a strong adhesive force, may not be obtained. When the content of the structural unit (b1) derived from farnesene is 1% by mass or more, its heat shrinkage factor after the heat treatment is small, so that the generation of a heat stress due to the heat treatment is suppressed, and the adhesive force becomes stronger. The content of the structural unit (b1) in the polymer block (b) is preferably 30 to 100% by mass, and more preferably 45 to 100% by mass. In the case where the polymer block (b) comprises the structural unit (b2) derived from a conjugated diene other than farnesene, the content of the structural unit (b2) is preferably 70% by mass or less, and more preferably 55% by mass or less.

For example, in the case where the thermoplastic elastomer composition does not contain a softening agent (D) as described later, from the viewpoints of flexibility, molding processability, low-temperature adhesiveness, and low heat shrinkability, the content of the structural unit (b1) in the polymer block (b) is preferably 60 to 100% by mass, more preferably 80 to 100% by mass, and still more preferably 90 to 100% by mass, and practically, it is yet still more preferably 100% by mass. In the case where the thermoplastic elastomer composition contains a softening agent (D) as described later, from the same viewpoints, the content of the structural unit (b1) in the polymer block (b) is preferably 30 to 90% by mass, more preferably 30 to 80% by mass, and still more preferably 45 to 75% by mass.

A total content of the structural unit (b1) and the structural unit (b2) in the polymer block (b) is preferably 50% by mass or more, more preferably 60% by mass or more, still more preferably 70% by mass or more, and most preferably 90% by mass or more.

The hydrogenated block copolymer (A) is a hydrogenation product of the block copolymer (P) including at least one of each of the polymer block (a) and the polymer block (b). The hydrogenated block copolymer (A) is a preferably a hydrogeneration product of the block copolymer (P) including two or more of the polymer blocks (a) and one or more of the polymer blocks (b).

A binding form between the polymer block (a) and the polymer block (b) is not particularly limited, and it may be a linear, branched or radial form or may be a combination of two or more thereof. Among those, a form where the respective blocks are bound in a linear form is preferred, and when the polymer block (a) is expressed by "a", and the polymer block (b) is expressed by "b", a binding form expressed by (a-b), a-(b-a)$_m$, or b-(a-b)$_n$ is preferred. Each of l, m, and n independently represents an integer of 1 or more.

As for the binding form, a triblock copolymer expressed by (a-b-a) is preferred from the viewpoints of flexibility, molding processability, and handling properties.

In the case where the block copolymer (P) has two or more of the polymer blocks (a) or two or more of the polymer blocks (b), the respective polymer blocks may be a polymer block containing the same structural unit or may be a polymer block containing different structural units from each other. For example, in the two polymer blocks (a) in the triblock copolymer expressed by [a-b-a], the respective aromatic vinyl compounds may be the same as or different from each other in terms of the kind thereof.

A mass ratio [(a)/(b)] of the polymer block (a) to the polymer block (b) in the block copolymer (P) is 1/99 to 70/30. When the mass ratio [(a)/(b)] falls within the foregoing range, a thermoplastic elastomer composition which is excellent in flexibility and molding processability and capable of adhering to a ceramic or the like even through a heat treatment at low temperatures, in which in a peel test, the fracture morphology is cohesive failure, and which has a strong adhesive force, may be obtained. From the foregoing viewpoint, the mass ratio [(a)/(b)] of the polymer block (a) to the polymer block (b) is preferably 1/99 to 60/40, more preferably 10/90 to 55/45, still more preferably 10/90 to 45/55, and yet still more preferably 15/85 to 45/55.

A peak top molecular weight (Mp) of the hydrogenated block copolymer (A) is preferably 4,000 to 1,500,000, more preferably 9,000 to 1,200,000, still more preferably 30,000 to 1,000,000, and yet still more preferably 50,000 to 800,000 from the viewpoint of molding processability. The peak top molecular weight (Mp) as referred to in the present specification means a value measured by the method described in the Examples as described later.

A molecular weight distribution (Mw/Mn) of the hydrogenated block copolymer (A) is preferably 1 to 4, more preferably 1 to 3, and still more preferably 1 to 2. When the molecular weight distribution falls within the foregoing range, scattering in viscosity of the hydrogenated block copolymer (A) is small, and handling is easy.

So long as the effect of the present invention is not impaired, the block copolymer (P) may contain a polymer block (c) constituted of other monomer, in addition to the aforementioned polymer block (a) and polymer block (b).

Examples of such other monomer include unsaturated hydrocarbon compounds, such as propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, etc.; functional group-containing unsaturated compounds, such as acrylic acid, methacrylic acid, methyl acrylate, methyl methacrylate, acrylonitrile, methacrylonitrile, maleic acid, fumaric acid, crotonic acid, itaconic acid, 2-acryloylethanesulfonic acid, 2-methacryloylethanesulfonic acid, 2-acrylamide-2-methylpropanesulfonic acid, 2-ethacrylamide-2-methylpropanesulfonic acid, vinylsulfonic acid, vinyl acetate, methyl vinyl ether, etc.; and the like. These may be used solely or in combination of two or more thereof.

In the case where the block copolymer (P) has the polymer block (c), its content is preferably 50% by mass or less, more preferably 40% by mass or less, and still more preferably 30% by mass or less.

[Production Method of Hydrogenated Block Copolymer (A)]

The hydrogenated block copolymer (A) may be, for example, suitably produced by a polymerization step of obtaining the block copolymer (P) through anionic polymerization and a step of hydrogenating the carbon-carbon double bond in the polymer block (b) in the block copolymer (P).

<Polymerization Step>

The block copolymer (P) may be produced by a solution polymerization method, the method described in JP 2012-502135A or JP 2012-502136A, or the like. Among those, a solution polymerization method is preferred, and known methods, for example, an ionic polymerization method, such as anionic polymerization, cationic polymerization, etc., a radical polymerization method, etc., may be applied. Above all, an anionic polymerization method is preferred. According to the anionic polymerization method, an aromatic vinyl compound and farnesene and/or a conjugated diene other than farnesene are successively added in the presence of a solvent, an anionic polymerization initiator, and optionally a Lewis base, thereby obtaining the block copolymer (P).

Examples of the anionic polymerization initiator include alkali metals, such as lithium, sodium, potassium, etc.; alkaline earth metals, such as beryllium, magnesium, calcium, strontium, barium, etc.; lanthanide rare earth metals, such as lanthanum, neodymium, etc.; compounds containing the aforementioned alkali metal, alkaline earth metal or lanthanide rare earth metal; and the like. Among those, compounds containing an alkali metal or an alkali metal are preferred, and organic alkali metal compounds are more preferred.

Examples of the organic alkali metal compound include organic lithium compounds, such as methyllithium, ethyllithium, n-butyllithium, sec-butyllithium, t-butyllithium, hexyilithium, phenyllithium, stilbenelithium, dilithiomethane, dilithionaphthalene, 1,4-ditlihiobutane, 1,4-dilithio-2-ethylcyclohexane, 1,3,5-trilithiobenzene, etc.; sodium naphthalene; potassium naphthalene; and the like. Among those, organic lithium compounds are preferred, n-butyllithium and sec-butyllithium are more preferred, and sec-butyllithium is especially preferred. The organic alkali metal compound may also be used as an organic alkali metal amide through a reaction with a secondary amine, such as diisopropylamine, dibutylamine, dihexylamine, dibenzylamine, etc.

Although a use amount of the organic alkali metal compound which is used for the polymerization varies depending upon the molecular weight of the block copolymer (P), in general, it is in the range of from 0.01 to 3% by mass relative to the total amount of the aromatic vinyl compound, farnesene, and the conjugated diene other than farnesene.

The solvent is not particularly limited so long as it does not adversely affect the anionic polymerization reaction, and examples thereof include saturated aliphatic hydrocarbons, such as n-pentane, isopentane, n-hexane, n-heptane, isooctane, etc.; saturated alicyclic hydrocarbons, such as cyclopentane, cyclohexane, methylcyclopentane, etc.; aromatic hydrocarbons, such as benzene, toluene, xylene, etc.; and the like. These may be used solely or in combination of two or more thereof. A use amount of the solvent is not particularly limited.

The Lewis base plays a role to control microstructures in the structural unit derived from farnesene and the structural unit derived from a conjugated diene other than farnesene. Examples of such a Lewis base include ether compounds, such as dibutyl ether, diethyl ether, tetrahydrofuran, dioxane, ethylene glycol diethyl ether, etc.; pyridine; tertiary amines, such as N,N,N',N'-tetramethylethylenediamine, trimethylamine, etc.; alkali metal alkoxides, such as potassium t-butoxide, etc.; phosphine compounds; and the like. In the case of using a Lewis base, in general, its amount is preferably in the range of from 0.01 to 1,000 molar equivalents per mole of the anionic polymerization initiator.

A temperature of the polymerization reaction is in the range of generally from −80 to 150° C., preferably from 0 to 100° C., and more preferably from 10 to 90° C. The polymerization reaction may be performed in a batchwise mode or a continuous mode. The block copolymer (P) may be produced by feeding the respective monomers continuously or intermittently into the polymerization reaction solution in such a manner that the existent amounts of the aromatic vinyl compound, farnesene and/or the conjugated diene other than farnesene in the polymerization reaction system fall within the specified ranges, or successively adding the respective monomers an as to have specified ratios in the polymerization reaction solution.

The polymerization reaction may be terminated by the addition of an alcohol, such as methanol, isopropanol, etc., as a polymerization terminator. The block copolymer (P) may be isolated by pouring the resulting polymerization reaction solution into a poor solvent, such as methanol, etc., to deposit the block copolymer (P), or by washing the polymerization reaction solution with water and separating the polymerization reaction product, followed by drying.

In the present polymerization process, though the unmodified block copolymer (P) may be obtained as described above, the modified block copolymer (P) may also be obtained by introducing a functional group into the aforementioned block copolymer (P) prior to a hydrogenation process as described later. Examples of the functional group which may be introduced include an amino group, an alkoxysilyl group, a hydroxyl group, an epoxy group, a carboxyl group, a carbonyl group, a mercapto group, an isocyanate group, an acid anhydride, and the like.

Examples of the modification method of the block copolymer (P) include a method in which prior to adding a polymerization terminator, a modifying agent capable of reacting with a polymerization active terminal, such as tin tetrachloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane, 2,4-tolylene diisocyanate, 4,4'-bis(diethylamino)benzophenone, N-vinylpyrrolidone, etc., or other modifying agent described in JP 2011-132298A is added. A material obtained by grafting maleic anhydride or the like on the copolymer after isolation may also be used.

A position at which the functional group is introduced may be either a polymerization terminal or side chain of the block copolymer (P). The aforementioned functional group may be introduced solely or in combination of two or more thereof. In general, an amount of the modifying agent is preferably in the range of from 0.01 to 10 molar equivalents to the anionic polymerization initiator.

<Hydrogenation Step>

The hydrogenated block copolymer (A) may be obtained by subjecting the obtained block copolymer (P) or modified block copolymer (P) by the aforementioned method to a hydrogenation process. As a method of performing the hydrogenation, a known method may be adopted. For example, the hydrogenation reaction is performed by allowing a Ziegler catalyst; a nickel, platinum, palladium, ruthenium, or rhodium metal al catalyst supported on carbon, silica, diatomaceous earth, or the like; an organic metal complex having a cobalt, nickel, palladium, rhodium, or ruthenium metal; or the like to exist as a hydrogenation catalyst in a solution in which the block copolymer (P) is dissolved in a solvent which does not affect the hydrogenation reaction. In the hydrogenation step, the hydrocarbon reaction may also be performed by adding the hydrogenation catalyst in a polymerization reaction solution containing the block copolymer (P) obtained by the production method of the block copolymer (P) as described above. In the present invention, palladium carbon having palladium supported on carbon is preferred.

In the hydrogenation reaction, a hydrogen pressure is preferably 0.1 to 20 MPa, a reaction temperature is preferably 100 to 200° C., and a reaction time is preferably 1 to 20 hours.

A hydrogenation rate of the carbon-carbon double bond in the polymer block (b) is preferably 50 to 100 mol % from the viewpoint of obtaining a thermoplastic elastomer composition which is excellent in flexibility and molding processability. The hydrogenation rate is more preferably 70 to 100 mol %, still more preferably 80 to 100 mol %, and yet still more preferably 85 to 100 mol %. The hydrogenation rate may be calculated by measuring $^1$H-NMR of the block copolymer (P) and the hydrogenated block copolymer (A) after the the hydrogenation.

[Polar Group-Containing Olefinic Polymer (B)].

In view of the fact that the thermoplastic elastomer composition of the present invention contains the polar group-containing olefinic polymer (B), it is provided with both appropriate flexibility and molding processability and is capable of adhering to a ceramic, a metal, a resin, concrete, asphalt, or the like even through a heat treatment at low temperatures without requiring a primer treatment or the like. Furthermore, in a peel test, the fracture morphology is cohesive failure, and a strong adhesive force may be exhibited.

Although details of the reasons why such effects are obtained are not elucidated yet, the following reasons may be considered. That is, in view of the fact of containing the polar group-containing olefinic polymer (B), compatibility of the thermoplastic elastomer composition of the present invention with an adherend, such as a ceramic, a metal, a resin, concrete, asphalt, etc., becomes good; in the case where the adherend has a polar group, a chemical bond is produced between the polar group contained in the polar group-containing olefinic polymer (B) and the polar group on the surface of the adherend; and so on.

The olefin constituting the polar group-containing olefinic polymer (B) is preferably an olefin having 2 to 10 carbon atoms, and more preferably an olefin having 2 to 8 carbon atoms. Examples of such an olefin include ethylene, propylene, 1-butene, 1-pentene, 1-hexene, 1-octene, 4-methyl-1-pentene, cyclohexene, and the like. These olefins may be used solely, or may be a copolymer of a combination of two or more thereof. Among those, ethylene and propylene are preferred, and propylene is more preferred.

Examples of the polar group which the polar group-containing olefinic polymer (B) has include a (meth)acryloyloxy group; a hydroxyl group; an amide group; a halogen atom, such as a chlorine atom, etc.; a carboxyl group; an ester group; an acid anhydride group; and the like. Among those, a (meth)acryloyloxy group, a carboxyl group, an ester group, and an acid anhydride group are preferred from the viewpoint of an improvement adhesive force, and a carboxyl group and an acid anhydride group are more preferred.

Although a production method of the polar group-containing olefinic polymer (B) is not particularly limited, the polar group-containing olefinic polymer (B) is obtained by subjecting an olefin and a polar group-containing copolymerizable monomer to random copolymerization, block copolymerization, or graft copolymerization by a known method. Among those, random copolymerization and graft copolymerization are preferred, and graft copolymerization is more preferred. Besides, the polar group-containing olefinic polymer (B) is also obtained by subjecting a polyolefin-based resin to a reaction, such as oxidation, chlorination, etc., by a known method. The polar group-containing olefinic polymer (B) may also be produced by allowing a commercially available polyolefin to react with a polar group-containing compound to perform modification.

Examples of the polar group-containing copolymerizable monomer include vinyl acetate, vinyl chloride, ethylene oxide, propylene oxide, acrylamide, and an unsaturated carboxylic acid or its ester or acid anhydride. Among those, an unsaturated carboxylic acid or its ester or acid anhydride is preferred. Examples of the unsaturated carboxylic acid or its ester or acid anhydride include (meth)acrylic acid, a (meth)acrylic acid ester, maleic acid, maleic anhydride, fumaric acid, itaconic acid, itaconic anhydride, himic acid, himic anhydride, and the like. Among those, maleic acid and maleic anhydride are more preferred. These polar group-containing copolymerizable monomers may be used solely or in combination of two or more thereof.

Specifically, examples of the (meth)acrylic acid ester exemplified as the polar group-containing copolymerizable monomer include acrylic acid alkyl esters, such as methyl acrylate, ethyl acrylate, n-propyl acrylate, isopropyl acrylate, n-butyl acrylate, isobutyl acrylate, n-hexyl acrylate, isohexyl acrylate, n-octyl acrylate, isooctyl acrylate, 2-ethylhexyl acrylate, etc.; and methacrylic acid alkyl esters, such as methyl methacrylate, ethyl methacrylate, n-propyl methacrylate, isopropyl methacrylate, n-butyl methacrylate, isobutyl methacrylate, n-hexyl methacrylate, isohexyl methacrylate, n-octyl methacrylate, isooctyl methacrylate, 2-ethylhexyl methacrylate, etc. These (meth)acrylic acid esters may be used solely or in combination of two or more thereof.

From the viewpoint of adhesiveness, the polar group-containing olefinic polymer (B) is preferably a polyolefin containing a carboxylic group or an acid anhydride group as the polar group, namely a carboxylic acid-modified olefinic polymer or a carboxylic acid anhydride-modified olefinic polymer, and more preferably a maleic acid-modified olefinic polymer or a maleic anhydride-modified olefinic polymer.

The polar group which the polar group-containing olefinic polymer (B) has may be post-treated after the polymerization. For example, the (meth)acryloyloxy group or carboxyl group may be converted into an ionomer through neutralization with a metal ion, or may be esterified with methanol or ethanol. The polar group may also be hydrolyzed with vinyl acetate.

A melt flow rate (MFR) of the polar group-containing olefinic polymer (B) under conditions at 230° C. and at a load of 2.16 kg (21 N) is preferably 0.1 to 300 g/10 min, more preferably 0.1 to 100 g/min, still more preferably 0.1 to 80 g/10 min, yet still more preferably 0.1 to 50 g/10 min, and especially preferably 1 to 30 g/10 min. When the MFR of the polar group-containing olefinic polymer (13) under the aforementioned conditions is 0.1 g/10 min or more, good molding processability is obtained. On the other hand, when the foregoing MFR is 300 g/10 min or less, dynamic properties are readily revealed. The MFR is measured by the method described in the Examples.

From the viewpoint of heat resistance, a melting point of the polar group-containing olefinic polymer (B) is preferably 100° C. or higher, more preferably 110 to 170° C., and still more preferably 120 to 145° C. The melting point is measured by the method described in the Examples.

A proportion of a polar group-containing structural unit which the polar group-containing olefinic polymer (B) has to the whole of structural units is preferably 0.01 to 10% by mass. When the proportion of the polar group-containing structural unit is 0.01% by mass or more, a thermoplastic elastomer composition which is capable to adhering to a ceramic or the like even through a heat treatment at low temperatures, in which in a peel test, the fracture morphology is cohesive failure, and which has a strong adhesive force may be obtained. When the proportion of the polar group-containing structural unit is 10% by mass or less, affinity with the hydrogenated block copolymer (A) is improved, the dynamic properties become good, and the resulting thermoplastic elastomer composition is excellent in flexibility and molding processability. The foregoing proportion is more preferably 0.01 to 7% by mass, and still more preferably 0.01 to 5% by mass. For the purpose of making the proportion of the polar group-containing structural unit optimum, a material prepared by diluting a polyolefin-based resin containing a polar group-containing structural unit in a high concentration with a polyolefin-based resin not containing a polar group-containing structural unit may also be used as the polar group-containing olefinic polymer (B). A total content of the polar group-containing structural unit and the olefin-derived structural unit relative to the structural unit which the polar group-containing olefinic polymer (B) has is preferably 80% by mass or ore, more preferably 90% by mass or more, still more preferably 95% by mass or more, and yet still more preferably 100% by mass.

The thermoplastic elastomer composition of the present invention contains the polar group-containing olefinic polymer (B) in a content of 5 to 300 parts by mass based on 100 parts by mass of the hydrogenated block copolymer (A). When the content of the polar group-containing olefinic polymer (B) is 5 parts by mass or more, a thermoplastic elastomer composition which is capable to adhering to a ceramic or the like even through a heat treatment at low temperatures, in which in a peel test, the fracture morphology is cohesive failure, and which has a strong adhesive force may be obtained. On the other hand, when the content of the polar group-containing olefinic polymer (B) is more than 300 parts by mass, though sufficient adhesiveness is obtained, the thermoplastic elastomer composition becomes hard, so that there is a concern that lowerings in flexibility and molding processability are brought. From the same viewpoint, the content of the polar group-containing olefinic polymer (B) is preferably 10 parts by mass or more, and more preferably 15 parts by mass or more, and preferably 250 parts by mass or less, and more preferably 200 parts by mass or less based on 100 parts by mass of the hydrogenated block copolymer (A).

In view of the foregoing, the content of the polar group-containing olefinic polymer (B) is preferably 10 to 250 parts by mass, and more preferably 15 to 200 parts by mass based on 100 parts by mass of the hydrogenated block copolymer (A).

[Polyvinyl Acetal Resin (C)]

The thermoplastic elastomer composition of the present invention may contain a polyvinyl acetal resin (C). In view of containing the polyvinyl acetal resin (C), the thermoplastic elastomer composition of the present invention is able to improve an adhesive force to a ceramic, particularly a glass or the like.

The polyvinyl acetal resin (C) is in general a resin having a recurring unit represented by the following formula (II).

by means of hydrolysis of polyvinyl acetate or the like with an alkali, an acid, ammonia water, or the like. Examples of a commercially available product thereof include "KURARAY POVAL" Series, manufactured by Kuraray Co., Ltd. The polyvinyl alcohol may be either completely hydrolyzed polyvinyl alcohol or partially hydrolyzed polyvinyl alcohol. A degree of hydrolysis is preferably 80 mol % or more, more preferably 90 mol % or more, and still more preferably 95 mol % or more.

As the aforementioned polyvinyl alcohol, a copolymer of vinyl alcohol and a monomer which is copolymerizable with vinyl alcohol, such as an ethylene-vinyl alcohol copolymer, a partially hydrolyzed ethylene-vinyl alcohol copolymer, etc., may be used. Furthermore, modified polyvinyl alcohol having a carboxylic acid introduced into a part thereof may be used. These polyvinyl alcohols may be used solely or in combination of two or more thereof.

The aldehyde which is used for the production of the polyvinyl acetal resin (C) is not particularly limited. Examples thereof include formaldehyde (inclusive of para-

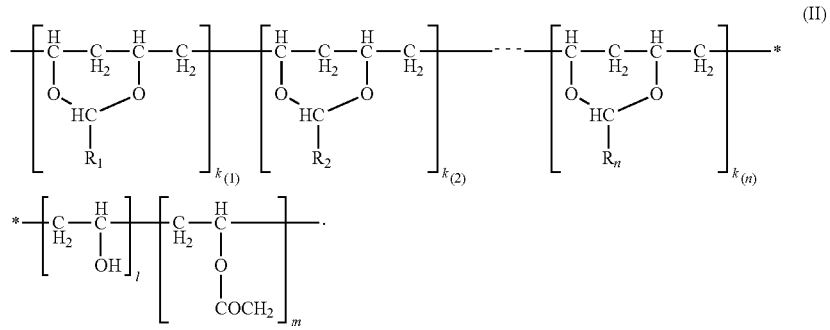

In the foregoing formula (II), n represents a number of kinds of aldehydes used for the acetalization reaction. Each of $R_1, R_2, \ldots, R_n$ represents an alkyl residue or a hydrogen atom of the aldehyde used for the acetalization reaction; and each of $k_{(1)}, k_{(2)}, \ldots, k_{(n)}$ represents a proportion (molar ratio) of a structural unit represented by [ ]. l represents a proportion (molar ratio) of a vinyl alcohol unit; and m represents a proportion (molar ratio) of a vinyl acetate unit.

However, $(k_{(1)}+k_{(2)}+ \ldots +k_{(n)}+l+m=1)$, and any one of $k_{(1)}, k_{(2)}, \ldots, k_{(n)}$, l, and m may be zero.

The respective recurring units are not particularly limited by the aforementioned configuration order, and they may be configured randomly, may be configured in a block form, or may be configured in a tapered form.

The polyvinyl acetal resin (C) may be, for example, obtained by allowing polyvinyl alcohol and an aldehyde to react with each other.

An average degree of polymerization of the polyvinyl alcohol which is used for the production of the polyvinyl acetal resin (C) is preferably 100 to 4,000, more preferably 100 to 3,000, still more preferably 100 to 2,000, and yet still more preferably 250 to 2,000.

Here, the average degree of polymerization of the polyvinyl alcohol is one measured in conformity with JIS K6726. Specifically, the average degree of polymerization of the polyvinyl alcohol is a value determined from an intrinsic viscosity obtained by means of rehydrolysis of polyvinyl alcohol, purification, and then measurement in water at 30° C.

A production method of polyvinyl alcohol is not particularly limited, and for example, polyvinyl alcohol produced formaldehyde), acetaldehyde (inclusive of para-acetaldehyde), propionaldehyde, n-butylaldehyde, isobutylaldehyde, pentanal, hexanal, heptanal, n-octanal, 2-ethylhexylaldehyde, cyclohexanecarbaladehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, β-phenylpropionaldehyde, and the like. These aldehydes may be used solely or in combination of two or more thereof. Among those, from the viewpoint of ease of production, butylaldehydes are preferred, and n-butylaldehyde is more preferred.

The polyvinyl acetal resin (C) which is obtained by means of acetalization with a butylaldehyde is referred to especially as "polyvinyl butyral (PVB)". The polyvinyl acetal resin is preferably PVB.

A degree of acetalization of the polyvinyl acetal resin (C) which is used in the present invention is preferably 55 to 88 mol %. The polyvinyl acetal resin (C) having a degree of acetalization of 55 mol % or more is low in production costs, easy in availability, and good in molding processability. On the other hand, the polyvinyl acetal resin (C) having a degree of acetalization of 88 mol % or less is very easy in production and does not require a long time for the acetalization reaction in the production, and hence, it is economical.

The degree of acetalization of the polyvinyl acetal resin (C) is more preferably 60 to 88 mol %, still more preferably 70 to 88 mol %, and especially preferably 75 to 85 mol %. When the degree of acetalization of the polyvinyl acetal resin (C) is lower, a proportion of the hydroxyl group which the polyvinyl acetal resin (C) has becomes large, so that such is advantageous in terms of adhesiveness to a ceramic, a metal, a resin, or the like. However, by allowing the degree of acetalization to fall within the foregoing range, the affinity or compatibility with the hydrogenated block copolymer (A) becomes good, and the adhesive force of the thermoplastic elastomer composition of the present invention is more improved.

The degree of acetalization of the polyvinyl acetal resin (C) may be determined according to the method described in JIS K6728 (1977).

The degree of acetalization of the polyvinyl acetal resin (C) may also be calculated by dissolving the polyvinyl acetal resin (C) in an appropriate deuterated solvent, such as deuterated dimethyl sulfoxide, etc., and measuring $^1$H-NMR or $^{13}$C-NMR.

The reaction (acetalization reaction) between polyvinyl alcohol and an aldehyde may be performed by a known method. Examples thereof include an aqueous medium method in which an aqueous solution of polyvinyl alcohol and an aldehyde are subjected to an acetalization reaction in the presence of an acid catalyst, thereby depositing particles of the polyvinyl acetal resin (C); a solvent method in which polyvinyl alcohol is dispersed in an organic solvent and subjected to an acetalization reaction with an aldehyde in the presence of an acid catalyst, and the resulting reaction mixed solution is mixed with water or the like that is a poor solvent against the polyvinyl acetal resin (C), thereby depositing the polyvinyl acetal resin (C); and the like.

The acid catalyst is not particularly limited, and examples thereof include organic acids, such as acetic acid, p-toluenesulfonic acid, etc.; inorganic acids, such as nitric acid, sulfuric acid, hydrochloric acid, etc.; gases which when formed into an aqueous solution, exhibit acidity, such as carbon dioxide, etc.; solid acid catalysts, such as a cation exchange resin, a metal oxide, etc.; and the like.

In general, a slurry produced by the aforementioned aqueous medium method or solvent method or the like assumes acidity due to an acid catalyst. Examples of a method of removing the acid catalyst include a method in which water washing of the slurry is repeated, thereby adjusting the pH to preferably 5 to 9, more preferably 6 to 9, and still more preferably 6 to 8; a method in which a neutralizing agent is added to the slurry, thereby adjusting the pH to preferably 5 to 9, more preferably 6 to 9, and still more preferably 6 to 8; a method in which an alkylene oxide or the like is added to the slurry; and the like.

Examples of a compound which is used for adjusting the pH include alkali metal hydroxides, such as sodium hydroxide, potassium hydroxide, etc.; alkali metal acetates, such as sodium acetate, etc.; alkali metal carbonates, such as sodium carbonate, potassium carbonate, etc.; alkali metal hydrogencarbonates, such as sodium hydrogencarbonate, etc.; ammonia; an ammonia aqueous solution; and the like. Examples of the alkylene oxide include ethylene oxides, propylene oxide, and glycidyl ethers, such as ethylene glycol diglycidyl ether, etc.

Subsequently, a salt produced by neutralization, a reaction residue of the aldehyde, and the like are removed. The removal method is not particularly limited, and a method of repeating dehydration and water washing, or the like is generally adopted. The polyvinyl acetal resin (C) in a hydrated state, from which the residue or the like has been removed, is optionally dried and then processed in a powdered state, a granular state, or a pellet state, if desired.

In the case of containing the polyvinyl acetal resin (C) in the thermoplastic elastomer composition of the present invention, it is preferred to contain the polyvinyl acetal resin (C) in a content of 0.1 to 100 parts by mass based on 100 parts by mass of the hydrogenated block copolymer (A). When the content of the polyvinyl acetal resin (C) falls within the foregoing range, the adhesive force to a ceramic (for example, a glass) may be more improved, and the matter that the thermoplastic elastomer composition becomes hard is prevented from occurring, thereby revealing flexibility. The content of the polyvinyl acetal resin (C) is more preferably 1 to 70 parts by mass, still more preferably 5 to 70 parts by mass, and yet still more preferably 10 to 50 parts by mass based on 100 parts by mass of the hydrogenated block copolymer (A).

[Softening Agent (D)]

The thermoplastic elastomer composition of the present invention may further contain a softening agent (D). As the softening agent (D), softening agents which are generally used for rubbers or plastics may be used. Examples thereof include paraffin-based, naphthene-based, or aromatic process oils; phthalic acid derivatives, such as dioctyl phthalate, dibutyl phthalate, etc.; white oil; mineral oils; liquid co-oligomers between ethylene and an α-olefin; liquid paraffins; polybutene; low molecular weight polyisobutylene; liquid polydienes, such as liquid polybutadiene, liquid polyisoprene, a liquid polyisoprene/butadiene copolymer, a liquid styrene/butadiene copolymer, a liquid styrene/isoprene copolymer, etc.; hydrogenation products thereof; and the like. Among those, from the viewpoint of compatibility with the block hydrogenated copolymer (A), paraffin-based process oils; liquid co-oligomers between ethylene and an α-olefin; liquid paraffins; low molecular weight polyisobutylene; and hydrogenation products thereof are preferred, and hydrogenation products of paraffin-based process oils are more preferred.

A known softening agent which is generally used in combination with a polyvinyl acetal resin, for example, organic acid ester-based plasticizers, such as a monobasic organic acid ester, a polybasic organic acid ester, etc.; phosphorus acid-based plasticizers, such as an organic phosphoric acid ester, an organic phosphorous acid ester, etc.; and the like, may also be used.

Examples of the monobasic organic acid ester include glycol-based esters obtained through a reaction between a glycol, such as triethylene glycol, tetraethylene glycol, tripropylene glycol, etc., and a monobasic organic acid, such as butyric acid, isobutyric acid, caproic acid, 2-ethylbutyric acid, heptylic acid, n-octylic acid, 2-ethylhexylic acid, pelargonic acid (n-nonylic acid), decylic acid, etc., which are represented by triethylene glycol-dicaproic acid ester, triethylene glycol-di-2-ethylbutyric acid ester, triethylene glycol-di-n-octylic acid ester, triethylene glycol-di-2-ethylhexylic acid ester, and the like.

Examples of the polybasic organic acid ester include esters between a polybasic organic acid, such as adipic acid, sebacic acid, azelaic acid, etc., and a linear or branched alcohol, which are represented by dibutyl sebacate, dioctyl azelate, dibutylcarbitol adipate, and the like, and the like.

Examples of the organic phosphoric acid ester include tributoxyethyl phosphate, isodecylphenyl phosphate, triisopropyl phosphate, and the like.

The softening agent (D) may be used solely or in combination of two or more thereof.

In the case where the thermoplastic elastomer composition of the present invention contains the softening agent (D), its contents preferably in the range of 0.1 to 300 parts by mass based on 100 parts by mass of the hydrogenated block copolymer (A). When the content of the softening agent (D) falls within the foregoing range, the flexibility and molding processability of the thermoplastic elastomer composition are more improved. From the foregoing viewpoint, the content of the softening agent (D) is preferably 1 to 300 parts by mass, more preferably 10 to 250 parts by mass, and still more preferably 50 to 200 parts by mass based on 100 parts by mass of the hydrogenated block copolymer (A).

[Other Optional Components]

So long as the effect of the present invention is not impaired, the thermoplastic elastomer composition of the present invention may contain other thermoplastic polymer, an inorganic filler, a tackifying resin, an antioxidant, a lubricant, a light stabilizer, a processing auxiliary, a colorant, such as a pigment, a coloring matter, etc., a flame retardant, an antistatic agent, a matting agent, a silicone oil, an anti-blocking agent, an ultraviolet absorber, a mold releasing agent, a foaming agent, an antibacterial agent, a fungicide, or a perfume, if desired. Examples of the aforementioned other thermoplastic polymer include a polar group-free olefinic polymer, a styrene-based polymer, a polyphenylene ether-based resin, polyethylene glycol, and the like. Among those, when a polar group-free olefinic polymer is contained in the thermoplastic elastomer composition of the present invention, the molding processability is more improved. As such a polar group-free olefinic polymer, for example, one or more selected from polyethylene, polypropylene, polybutene, a block copolymer or random copolymer of propylene and other α-olefin, such as ethylene, 1-butene, etc., and the like may be used.

In the case of containing other thermoplastic polymer, its content is preferably 100 parts by mass or less, more preferably 50 parts by mass or less, still more preferably 20 parts by mass or less, and yet still more preferably 10 parts by mass or less based on 100 parts by mass of the hydrogenated block copolymer (A).

The aforementioned inorganic filler may be contained for the purposes of improving physical properties of the thermoplastic elastomer composition of the present invention, such as heat resistance, weather resistance, etc., adjusting the hardness, improving the economy as an extending agent, and so on. Examples of the inorganic filler include calcium carbonate, talc, magnesium hydroxide, alum hydroxide, mica, clay, naturally occurring silicic acid, synthetic silicic acid, titanium oxide, carbon black, barium sulfate, a glass balloon, a glass fiber, and the like. The inorganic filler may be used solely or in combination with two or more thereof.

In the case of containing the inorganic filler, it is preferred that its content falls within a range where the flexibility of the thermoplastic elastomer composition is not impaired. The foregoing content is preferably 100 parts by mass or less, more preferably 70 parts by mass or less, still more preferably 30 parts by mass or less, and especially preferably 10 parts by mass or less based on 100 parts by mass of the hydrogenated block copolymer (A).

Examples of the aforementioned tackifying resin include a rosin-based resin, a terpene phenol resin, a terpene resin, an aromatic hydrocarbon-modified terpene resin, an aliphatic petroleum resin, an alicyclic petroleum resin, an aromatic petroleum resin, a coumarone-indene resin, a phenol-based resin, a xylene resin, and the like.

In the case of containing the tackifying resin, it is preferred that its content falls within a range where the dynamic properties of the thermoplastic elastomer composition are not impaired. The foregoing content is preferably 100 parts by mass or less, more preferably 70 parts by mass or less, still more preferably 30 parts by mass or less, and especially preferably 10 parts by mass or less based on 100 parts by mass of the hydrogenated block copolymer (A).

Examples of the aforementioned antioxidant include a hindered phenol-based antioxidant, a phosphorus-based antioxidant, a lactone-based antioxidant, a hydroxyl-based antioxidant, and the like. Among those, a hindered phenol-based antioxidant is preferred. In the case of containing the antioxidant, it is preferred that its content falls within a range where in melt kneading the resulting thermoplastic elastomer composition, the resultant is not colored. The foregoing content is preferably 0.1 to 5 parts by mass based on 100 parts by mass of the hydrogenated block copolymer (A).

The production method of the thermoplastic elastomer composition of the present invention is not particularly limited, and the thermoplastic elastomer composition of the present invention may be produced by any method hod so long as the hydrogenated block copolymer (A) and the polar group-containing olefinic polymer (B), and the polyvinyl acetal resin (C), the softening agent (D), and other components, which are optionally added, may be uniformly mixed. A melt kneading method is preferably adopted. The melt kneading may be, for example, performed by using a melt kneading apparatus, such as a single-screw extruder, a twin-screw extruder, a kneader, a batch mixer, a roller, a Banbury mixer, etc. Preferably, by performing melt kneading at 170 to 270° C., the thermoplastic elastomer composition of the present invention may be obtained.

As for the thus obtained thermoplastic elastomer composition of the present invention, a hardness according to the JIS-A method of JIS K6253 (hereinafter sometimes referred to as "hardness A") is preferably 93 or less, more preferably 85 or less, and still more preferably 75 or less. When the hardness A is excessively high, good flexibility, elasticity and dynamic properties are hardly obtained, so there is a tendency that its difficult to suitably use the composition as a thermoplastic elastomer composition having excellent adhesiveness to a synthetic resin, particularly a resin containing an inorganic filler (e.g., a glass fiber, etc.), a ceramic, a metal, or the like.

[2] Adhesive

The present invention also provides an adhesive including the aforementioned thermoplastic elastomer composition of the present invention. The thermoplastic elastomer composition of the present invention has good adhesiveness to a ceramic, concrete, asphalt, a metal, a polar resin, a polyolefin resin, or the like, and hence, it is suitably used as an adhesive for adhering not only materials of the same kind but also materials of a different kind from each other. Moreover, the thermoplastic elastomer composition of the present invention also has flexibility, and hence, it also has a buffer action against a difference in coefficient of thermal expansion between materials of a different kind from each other. A content of the thermoplastic elastomer composition in the adhesive is preferably 80% by mass or more, more preferably 90% by mass or more, still more preferably 95% by mass or more, and yet still more preferably 100% by mass.

The strength of the adhesive force of the thermoplastic elastomer composition of the present invention may also be, for example, evaluated by observing the fracture morphology of a test body after a peel test. The thermoplastic elastomer composition of the present invention causes chiefly cohesive failure in a peel test. The cohesive failure as referred to herein means a mode in which an adhesive layer itself including the thermoplastic elastomer composition of the present invention is fractured. In general, as compared with interfacial delamination, according to the cohesive failure, the thermoplastic elastomer composition adheres more strongly to a base material and is considered high in reliability as an adhesive. Therefore, the adhesive including the thermoplastic elastomer composition of the present invention may be suitably used for various applications requiring an adhesive force.

[3] Molded Article

The present invention also provides a molded article including the aforementioned thermoplastic elastomer composition of the present invention.

The thermoplastic elastomer composition of the present invention is excellent in molding processability, and hence, various molded bodies may be produced therefrom. The molded article may be a sheet or a film, too.

As a molding method, various molding methods which are generally adopted for a thermoplastic elastomer composition may be adopted. Specifically, optional molding methods, such as an injection molding method, an extrusion molding method, a press molding method, a blow molding method, a calender molding method, a cast molding method, etc., may be adopted. For molding of a film or sheet, a general T-die method, calender method, inflation method, or belt method, or the like may also be adopted.

A preferred embodiment of the molded article of the present invention is a molded article including the aforementioned thermoplastic elastomer composition of the present invention adhered to at least one selected from a ceramic, a metal, a polar resin, and a polyolefin resin (hereinafter sometimes referred to as "adherend"). The molded article of the present invention may also be a laminated molded article in which the aforementioned thermoplastic elastomer composition is adhered to two or more of the aforementioned adherends.

The adhesive force of the thermoplastic elastomer composition in the molded article is a value measured in conformity with JIS K6854-2 and is preferably 20 N/25 mm or more. When the adhesive force is 20 N/25 min or more, it may be said that the thermoplastic elastomer composition is thoroughly adhered from the viewpoint of practical use. This adhesive force is more preferably 50 N/25 or more, still more preferably 70 N/25 mm or more, and yet still more preferably 80 N/25 mm or more.

Furthermore, the thermoplastic elastomer composition of the present invention is able to adhere to the aforementioned adherend through a heat treatment at low temperatures (190° C. or lower) without requiring a primer treatment or the like. In consequence, in a production process of a molded article in which the adherend and the thermoplastic elastomer composition of the present invention are adhered to each other, even by performing cooling to an extent that a surface temperature of this thermoplastic elastomer composition discharged from an injection molding machine or an extrusion machine is 190° C. or lower, it is possible to perform sufficient adhesion, and hence, existing equipment may be used as it is without separately setting up a heater. So far as the temperature is 190° C. or lower, a large number of synthetic resin made members are neither melted nor deformed, breakage of the synthetic resin members in the surroundings of the adhesive portions to be simultaneously heated may be avoided from occurring. The heat treatment is performed preferably at 150° C. or higher, and more preferably 160° C. or higher.

The ceramic which may be used for the molded article of the present invention means a non-metallic inorganic material, and examples thereof include a metal oxide, a metal carbide, a metal nitride, and the like. For example, there are exemplified a glass, a cement, alumina, zirconia, a zinc oxide-based ceramic, barium titanate, lead zirconate titanate, silicon carbide, silicon nitride, a ferrite, and the like.

Examples of the metal which may be used for the molded article of the present invention include iron, copper, aluminum, magnesium, nickel, chromium, zinc, and alloys composed of those components. The molded article may also be a molded article having a surface of a metal formed by means of plating, such as copper plating, nickel plating, chromium plating, tin plating, zinc plating, platinum plating, gold plating, silver plating, etc.

Examples of the polar resin which may be used for the molded article of the present invention include a polyamide resin, a polyester resin, a polycarbonate resin, a polyphenyl sulfide resin, a (meth)acrylonitrile-butadiene-styrene resin, a (meth)acrylonitrile-styrene resin, a (meth)acrylic acid ester-butadiene-styrene resin, a (meth)acrylic acid ester-styrene resin, a butadiene-styrene resin, an epoxy resin, a phenol resin, a diallyl phthalate resin, a polyimide resin, a melamine resin, a polyacetal resin, a polysulfone resin, a polyether sulfone resin, a polyether imide resin, a polyphenylene ether resin, a polyallylate resin, a polyetheretherketone resin, a polystyrene resin, a syndiotactic polystyrene resin, and the like. These resins may be used solely or in combination of two or more thereof. As the aforementioned polyamide resin, for example, polyamide 6 (PA6), polyamide 66 (PA66), and the like are preferably used.

The aforementioned polar resin may contain an inorganic filler. Examples of the inorganic filler include calcium carbonate, talc, magnesium hydroxide, aluminum hydroxide, mica, clay, naturally occurring silicic acid, synthetic silicic acid, titanium oxide, carbon black, barium sulfate, a glass fiber, a glass balloon, and the like. The inorganic filler may be used solely or in combination of two or more thereof. Among those, a glass fiber is preferred.

A blending amount of the inorganic filler is preferably in a range where the processability and mechanical strength of the resin containing the inorganic filler are not impaired. In general, the blending amount of the inorganic filler is preferably 0.1 to 100 parts by mass, more preferably 1 to 50 parts by mass, and still more preferably 3 to 40 parts by mass based on 100 parts by mass of the aforementioned polar resin.

As the polyolefin resin which may be used for the molded article of the present invention, for example, polyethylene, polypropylene, polybutene-1, polyhexene-1, poly-3-methyl-butene-1, poly-4-methyl-pentene-1, a copolymer of ethylene and one or more selected from an α-olefin having 3 to 20 carbon atoms (for example, propylene, 1-butene, 1-pentene, 1-hexene, 1-pentene, 1-octene, 1-decene, 3-methyl-1-butene, 4-methyl-1-pentene, 6-methyl-1-heptene, isooctene, isooctadiene, decadiene, etc.), an ethylene/propylene/diene copolymer (EPDM), an ethylene-vinyl acetate copolymer, an ethylene-acrylic acid copolymer, and the like are preferably used.

The production method of the molded article of the present invention is not particularly limited, and any method may be adopted so long as it is a method of producing an adhesive molded article by means of melt adhesion. Examples thereof include molding methods, such as an injection insert molding method, an extrusion lamination method, a press molding method, a melt casting method, etc.

For example, in the case of producing an adhesive molded article by the injection insert molding method, there is adopted a method in which an adherend which has been previously formed in prescribed shape and size is disposed in a die, into which is then injection molded the thermoplastic elastomer composition of the present invention, thereby producing an adhesive molded article. In the case of producing an adhesive molded article by the extrusion lamination method, the adhesive molded article may also be produced by directly extruding the thermoplastic elastomer composition in a molten state, which has been extruded from a die installed in an extruder and having a prescribed shape, onto a surface of the adherend having been previously in prescribed shape and size, or an edge thereof. In the case of producing an adhesive molded article by the press molding method, the adhesive molded article may also be produced by previously molding a molded article including the thermoplastic elastomer composition of the present invention and then subjecting the molded article to heating and pressing on an adherent having been previously molded in prescribed shape and size by using a press molding machine or the like. Such molding methods are especially suited in the case where the adherend is a ceramic or a metal.

In the case where the adherend is a polar resin or a polyolefin resin, the both may be simultaneously melted and subjected to coextrusion molding, or may be subjected to coinjection molding. One of them may be previously molded, followed by performing melt coating thereon or solution coating. Besides, two-color molding, insert molding, or the like may also be adopted. The aforementioned melt coating or solution coating is also suitable in the case where the adherend is concrete or asphalt.

The thermoplastic elastomer composition of the present invention and the molded article of the present invention may be widely applied to various applications. For example, a synthetic resin, a synthetic resin containing a glass fiber, or a light metal, such as aluminum or a magnesium alloy, is used for a housing material, such as electronic or electrical appliances, OA appliances, household electrical appliances, automotive members, etc. The molded article having the thermoplastic elastomer composition of the present invention adhered to such a housing material may be used. More specifically, the molded article is preferred for applications upon being adhered to the housing of a large-sized display, a notebook computer, a mobile phone, PHS, PDA (personal digital assistant, such as electric organizer), an electronic dictionary, a video camera, a digital still camera, a portable radio cassette player, an inverter to work as a shock absorber, a non-slip coating, a waterproof material, a decorative material, or the like.

The thermoplastic elastomer composition is also useful in a wide application as a molded article or structural body to be adhered to a glass, for example, a window molding or gasket for automobiles or buildings, a sealing material for glass, an anti-corrosion material, or the like. The thermoplastic elastomer composition is also useful for adhesively joining glass with an aluminum sash or a metal opening of windows of automobiles or buildings, or adhesively joining glass with a metal frame of a photovoltaic module or the like as a sealant. Furthermore, the thermoplastic elastomer composition may also be suitably used as a separator of secondary batteries for use in various information terminals, such as a notebook computer, a mobile phone, a video camera, etc., a hybrid vehicle, a fuel cell vehicle, and so on.

Moreover, the thermoplastic elastomer composition may be suitably used for applications as an adhesive between a concrete layer and an asphalt layer of road paving of a bridge or the like and is also provided with an effect as a waterproof material.

EXAMPLES

The present invention is hereunder described by reference to Examples, but it should not be construed that the present invention is limited to these Examples. β-Farnesene (purity: 97.6% by mass, manufactured by Amyris, Inc.) was used for the following polymerization after purification with a molecular sieve of 3 angstroms and then distillation in a nitrogen atmosphere to remove hydrocarbon-based impurities inclusive of zingiberene, bisabolene, farnesene epoxide, farnesol isomers, E,E-farnesol, squalene, ergosterol, several kinds of dimers of farnesene, and the like.

Respective components used in the Examples and Comparative Examples are as follows.

<Hydrogenated Block Copolymer (A)>

Hydrogenated block copolymers (A-1) to (A-4) of Production Examples 1 to 4 as described later <Hydrogenated Block Copolymer (A')>

Hydrogenated block copolymers (A-1) to (A'-2) of Production Examples 5 and 6 as described later <Polar Group-Containing Olefinic Polymer (B)>

Polar group-containing olefinic polymers (B-1) to (B-2) of Production Examples 7 and 8 as described later <Polyvinyl Acetal Resin (C)>

Polyvinyl butyral (PVB) of Production Example 9 as described later

<Softening Agent (D)>

Hydrogenated paraffin-based oil ("Diana Process Oil PW-90", manufactured by Idemitsu Kosan Co., Ltd.)

Details of each of measurement methods in the Production Examples are as follows.

(1) Measurement of Molecular Weight Distribution, Peak Top Molecular Weight (Mp), Etc.:

A peak top molecular weight (Mp) and a molecular weight distribution (Mw/Mn) of a hydrogenated block copolymer were determined in terms of a molecular weight as converted into standard polystyrene by means of GPC (gel permeation chromatography), and a peak top molecular weight (Mp) was determined from a position of an apex of the peak of the molecular weight distribution. Measurement apparatus and conditions are as follows.

Apparatus: GPC apparatus "GPC8020", manufactured by Tosoh Corporation

Separation column: "TSKgei G4000HXL", manufactured by Tosoh Corporation

Detector: "RI-8020", manufactured by Tosoh Corporation

Solvent: Tetrahydrofuran

Solvent flow rate: 1.0 mL/min

Sample concentration: 5 mg/10 mL

Column temperature: 40° C.

(2) Measurement Method of Hydrogenation Rate:

In each of the Examples and Comparative Examples, a block copolymer before hydrogenation and a block copolymer after hydrogenation (hydrogenated block copolymer) were each dissolved in deuterochloroform and measured for $^1$H-NMR at 50° C. by using "Lambda-500", manufactured by JEOL Ltd. A hydrogenation rate of a polymer block (b) in the hydrogenated block copolymer (A) was calculated from peaks of protons which a carbon-carbon double bond had, the peaks appearing at 4.5 to 6.0 ppm of the resulting spectrum, according to the following equation.

Hydrogenation rate={1−(Molar number of carbon-carbon double bond contained per mole of block copolymer after hydrogenation)/(Molar number of carbon-carbon double bond contained per mole of block copolymer before hydrogenation)}×100 (mol %)

(3) Measurement Method of Melt Flow Rate (MFR):

A sample was measured with Melt Indexer L244 (manufactured by Technol Seven Co., Ltd.) under conditions at 230° C. and 21N in nozzle dimensions of 1 mm in diameter and 10 mm in length.

<Hydrogenated Block Copolymer (A)>

Production Example 1

50.0 kg of cyclohexane as a solvent and 35.1 g of a 10.5% by mass cyclohexane solution of sec-butyllithium (content of sec-butyllithium: 3.7 g) as an anionic polymerization initiator were charged in a nitrogen-purged, dried pressure container. After the temperature was raised to 50° C., 1.87 kg of styrene (1) was added to perform polymerization for 1 hour; subsequently, 8.75 kg of β-farnesene was added to perform polymerization for 2 hours; and additionally, 1.87 kg of styrene (2) was added to perform polymerization for 1 hour. There was thus obtained a reaction solution containing a polystyrene-poly(β-farnesene)-polystyrene triblock copolymer. To this reaction solution, palladium carbon (palladium supporting amount: 5% by mass) as a hydrogenation catalyst was added in an amount of 5% by mass relative to the block copolymer to perform a reaction under conditions at a hydrogen pressure of 2 MPa and at 150° C. for 10 hours. After allowing to stand for cooling and allowing to stand for pressure discharge, the palladium carbon was removed by means of filtration, and the filtrate was concentrated and further dried in vacuo. There was thus obtained a hydrogenation product of a polystyrene-poly(β-farnesene)-polystyrene triblock copolymer (hereinafter referred to as "hydrogenated block copolymer (A-1)"). The hydrogenated block copolymer (A-1) was subjected to the aforementioned evaluations. The results are shown in Table 1.

Production Examples 2 to 4

Hydrogenated block copolymers (A-2) to (A-4) were produced in the same manner as in Production Example 1, except for following the blending shown in Table 1. The obtained hydrogenated block copolymers (A-2) to (A-4) were each subjected to the aforementioned evaluations. The results are shown in Table 1.

Hydrogenated Block Copolymer (A')

Production Example 5

A hydrogenated block copolymer (A'-1) was produced in the same manner as in Production Example 1, except for mixing 50.0 kg of cyclohexane as a solvent with 288 g of tetrahydrofuran and following the blending shown in Table 1. The obtained hydrogenated block copolymer (A'-1) was subjected to the aforementioned evaluations. The results are shown in Table 1.

Production Example 6

A hydrogenated block copolymer (A'-2) was produced in the same manner as in Production Example 1, except for following the blending shown in Table 1. The obtained hydrogenated block copolymer (A'-2) was subjected to the aforementioned evaluations. The results are shown in Table 1.

TABLE 1

| | | 1 Production Example 1 | 2 Production Example 2 | 3 Production Example 3 | 4 Production Example 4 | 5 Production Example 5 | 6 Production Example 6 |
|---|---|---|---|---|---|---|---|
| | | A-1 | A-2 | A-3 | A-4 | A'-1 | A'-2 |
| Use amount [kg] | Cyclohexane | 50.0 | 50.0 | 50.0 | 50.0 | 50.0 | 50.0 |
| | sec-Butyllithium | 0.0369 | 0.0413 | 0.0155 | 0.023 | 0.0436 | 0.0239 |
| | Styrene (1) | 1.87 | 1.12 | 1.32 | 1.32 | 0.26 | 1.57 |
| | Styrene (2) | 1.87 | 1.12 | 1.32 | 1.32 | 0.79 | 1.57 |
| | β-Farnesene | 8.75 | 10.25 | 6.18 | 3.44 | — | — |
| | Butadiene | — | — | — | 2.73 | 3.44 | — |
| | Isoprene | — | — | — | — | 4.33 | 6.38 |
| (b1)/(B) [% by mass] | | 100 | 100 | 100 | 56 | 0 | 0 |
| (A)/(B) [mass ratio] | | 30/70 | 18/82 | 30/70 | 30/70 | 12/88 | 33/67 |
| Content of triblock body [% by mass] | | 100 | 100 | 100 | 100 | 100 | 100 |
| Peak top molecular weight (Mp) | | 222,000 | 200,500 | 373,000 | 350,000 | 202,000 | 328,000 |
| Molecular weight distribution (Mw/Mn) | | 1.14 | 1.23 | 1.40 | 1.13 | 1.02 | 1.07 |
| Hydrogenation rate (%) | | 90.6 | 92.8 | 87.6 | 99.0 | 87.9 | 90.2 |

Polar Group-Containing Olefinic Polymer (B)

Production Example 7

42 g of polypropylene "Prime Polypro F327" (MFR: 230° C., load: 2.16 kg (21 N)]: 7 g/10 min, manufactured by Prime Polymer Co., Ltd.), 160 mg of maleic anhydride, and 42 mg of 2,5-dimethyl-2,5-di(t-butylperoxy)hexane were melt kneaded by using a batch mixer under conditions at 180° C. and a screw rotation number of 40 rpm, thereby obtaining polypropylene (B-1) containing a maleic anhydride group. The obtained (B-1) had an MFR [230° C., 21 N] of 6 g/10 min, a proportion of a maleic anhydride group-containing structural unit of 0.3% by mass, and a melting point of 138° C. The proportion of the maleic anhydride group-containing structural unit is a value obtained by titrating the obtained (B-1) with a methanol solution of potassium hydroxide; hereinafter the same. The melting point is a value read from an endothermic peak of a differential scanning calorimetry curve in raising the temperature at a rate of 10° C./min; hereinafter the same.

Production Example 8

42 g of polypropylene "Novatec PP E111G" (manufactured by Japan Polypropylene Corporation), 8.4 g of maleic anhydride, and 126 mg of 2,5-dimethyl-2,5-di(t-butylperoxy)hexane were melt kneaded by using a batch mixer under conditions at 200° C. and a screw rotation number of 100 rpm, thereby obtaining polypropylene (B-2) containing a maleic anhydride group. The obtained (B-2) had an MFR [230° C., 21 N] of 80 g/10 min, a proportion of a maleic anhydride group-containing structural unit of 6.0% by mass, and a melting point of 135° C.

Polyvinyl Acetal Resin (C)

Production Example 9

To an aqueous solution having a polyvinyl alcohol resin having an average degree of polymerization of 500 and a degree of hydrolysis of 99 mol % dissolved therein, n-butylaldehyde and an acid catalyst (hydrochloric acid) were added and stirred to perform an acetalization reaction. A deposited resin was washed with water until its pH reached 6 and subsequently neutralized by the addition of a neutralizing agent, and thereafter, a salt produced by the neutralization was washed and removed. After dewatering, the product was dried to an extent that the content of a volatile matter was 0.3%, thereby obtaining a polyvinyl acetal resin having a degree of acetalization of 80 mol %.

Examples 1 to 12 and Comparative Examples 1 to 6

Respective components described in Tables 2 to 4 were melt kneaded in proportions shown in Tables 2 to 4 by using a batch mixer under conditions at 230° C. and a screw rotation number of 200 rpm, thereby preparing thermoplastic elastomer compositions. The obtained thermoplastic elastomer compositions were each evaluated for physical properties as follows. The results are shown in Tables 2 to 4.

(1) Measurement Method of Hardness:

(1-1) Preparation of Sheet of Thermoplastic Elastomer Composition:

Each of the thermoplastic elastomer compositions obtained in the Examples and Comparative Examples was subjected to compression press molding by using a compression press molding machine "NF-37", manufactured by SHINTO Metal Industries Corporation and using a metal frame coated with "Teflon (registered trademark)" as a spacer at 230° C. and at a load of 100 kgf/cm$^2$ for 5 minutes, and then subjected to compression press molding at 18° C. and at a load of 15 kgf/cm$^2$ for 1 minute, thereby obtaining a sheet of thermoplastic elastomer composition having a thickness of 1 mm.

(1-2) Measurement of Hardness:

A dumbbell No. 5 test piece in conformity with JIS K6251 was punched out from this sheet, thereby obtaining a test piece.

The obtained test piece was used and measured with an indenter of a type A durometer in conformity with JIS K6253-3. The lower the hardness, the more excellent the flexibility is.

(2) Melt Viscosity:

The sheet of thermoplastic elastomer composition as prepared above in (1-1) was shredded and then charged into a Capirograph (manufactured by Toyo Seiki Seisaku-Sho, Ltd.) to measure its melt viscosity in a capillary having a size of 1 mm$\phi$×10 mm at a temperature of 230° C. and at a shear rate of 1,210 s$^{-1}$. The smaller this value, the more excellent the moldability is.

Measurement Method of Adhesive Strength:

(3-1) Preparation of Sample for Measurement (Laminate):

<Preparation of Laminate with Aluminum Plate>

Both surfaces of an aluminum plate of 75 mm in length× 25 mm in width×1 mm in thickness were washed with, as a washing liquid, a surfactant aqueous solution and distilled water in this order, followed by drying. The aluminum plate, the sheet of thermoplastic elastomer composition as prepared above in (1-1), and a polyethylene terephthalate (PET) sheet having a thickness of 50 μm were superimposed in this order, and the resultant as disposed in a central portion of a metal-made spacer having an external size of 200 mm×200 mm, an internal size of 150 mm×150 mm, and a thickness of 2 mm.

This superimposed sheet and the metal-made spacer were sandwiched by a polytetrafluoroethylene-made sheet and further sandwiched by a metal plate from the outside, and the resultant was subjected to compression molding by using a compression molding machine under a temperature condition at 160° C. and at a load of 20 kgf/cm$^2$ (2 N/mm$^2$) for 3 minutes, thereby obtaining a laminate made of PET/(thermoplastic elastomer composition)/(aluminum plate).

<Preparation of Laminate with Glass Plate>

A laminate made of PET/(thermoplastic elastomer composition)/(glass plate) was obtained by performing the same operations as in the aforementioned preparation of a laminate with an aluminum plate, except for washing both surfaces of a glass plate of 75 mm in length×25 mm in width×1 mm in thickness with, as a washing liquid, a surfactant aqueous solution, methanol, acetone, and distilled water in this order, followed by drying.

<Preparation of Laminate with Polypropylene (PP) Plate>

A laminate made of PET/(thermoplastic elastomer composition)/(polypropylene plate) was obtained by performing the same operations as in the aforementioned preparation of a laminate with an aluminum plate, except for using a polypropylene plate of 75 mm in length×25 mm in width×1 mm in thickness, which was obtained through injection molding of polypropylene ("Novatec PP MA3", manufactured by Japan Polypropylene Corporation).

<Preparation of Laminate with Nylon Plate>

A laminate made of PET/(thermoplastic elastomer composition)/(nylon plate) was obtained by performing the same operations as in the aforementioned preparation of a laminate with an aluminum plate, except for using a nylon plate of 75 mm in length×25 mm in width×1 mm in thickness, which was obtained through injection molding of nylon ("UBE Nylon6 1013B", manufactured by Ube Industries, Ltd.).

(3-2) Measurement of Adhesive Strength:

Each of the above-prepared laminates was subjected to a peel adhesive strength test by using Instron's "Instron 5566" under conditions at a peel angle of 180° and at a tensile speed of 50 mm/min in conformity with JIS K6854-2, thereby measuring an adhesive strength (peel strength).

In addition, the laminate after the peel adhesive strength test was visually inspected, thereby evaluating whether the fracture morphology was cohesive failure or interfacial delamination. The case where the fracture morphology was cohesive failure is expressed as "A", and the case where the fracture morphology was interfacial delamination is expressed as "B".

(4) Measurement of Heat Shrinkage Factor:

A heat shrinkage factor was measured by the method in conformity with JIS K7133. That is, a test piece having a size of 120 mm×120 mm was cut out from the sheet of thermoplastic elastomer composition as prepared above in (1-1). Bench marks were provided in a central portion of the test piece, a bench mark distance ($L_0$) was measured at 23° C., and the test piece was then heated at 220° C. for 20 minutes. The test piece was taken out and then allowed to stand for cooling at 23° C. for 30 minutes, and a bench mark distance (L) was again measured. A heat shrinkage factor (ΔL) was calculated according to the following calculation method. It is exhibited that the smaller the value of the heat shrinkage factor, the more excellent the heat resistance of the obtained thermoplastic elastomer composition is.

$\Delta L = (L_0 - L)/L \times 100$

TABLE 2

| | | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|---|
| Hydrogenated block copolymer (A-1) | | 100 | | | | | | | | | | |
| Hydrogenated block copolymer (A-2) | | | 100 | | 100 | 100 | 100 | 100 | | | 100 | 100 |
| Hydrogenated block copolymer (A-3) | | | | 100 | | | | | | | | |
| Hydrogenated block copolymer (A-4) | | | | | | | | | | 100 | | |
| Hydrogenated block copolymer (A'-1) | | | | | | | | | 100 | | | |
| Hydrogenated block copolymer (A'-2) | | | | | | | | | | | | |
| Polar group-containing polyolefin polymer (B-1) | | 25 | 25 | 25 | 15 | 40 | 50 | | 25 | 400 | 400 | 2 |
| Polar group-containing polyolefin polymer (B-2) | | | | | | | | 25 | | | | |
| Polyvinyl acetal resin (C) | | | | | | | | | | | | |
| Softening agent (D) | | | | | | | | | | | | |
| Hardness | Type A | 44 | 34 | 41 | 18 | 55 | 61 | 41 | 71 | 95 | 90 | 10 |
| Melt viscosity | 1,210 s$^{-1}$ | 91 | 60 | 69 | 72 | 80 | 91 | 55 | 160 | 310 | 280 | 70 |
| Heat shrinkage factor | % | 7.0 | 4.2 | 5.1 | 7.9 | 6.1 | 5.5 | 6.4 | 15.3 | 8.8 | 2.7 | 13.0 |
| Aluminum | Peel strength (N/25 mm) | 193 | 107 | 108 | 117 | 130 | 149 | 99 | 55 | 170 | 160 | 10 |
| | Fracture morphology | A | A | A | A | A | A | A | B | A | A | B |
| Glass | Peel strength (N/25 mm) | 140 | 101 | 121 | 103 | 124 | 153 | 106 | 48 | 183 | 165 | 15 |
| | Fracture morphology | A | A | A | A | A | A | A | B | A | A | B |
| PP | Peel strength (N/25 mm) | 141 | 97 | 108 | 114 | 124 | 126 | 77 | 103 | 147 | 152 | 110 |
| | Fracture morphology | A | A | A | A | A | A | A | B | A | A | A |
| Nylon | Peel strength (N/25 mm) | 144 | 125 | 119 | 95 | 131 | 153 | 84 | 91 | 173 | 143 | 15 |
| | Fracture morphology | A | A | A | A | A | A | A | B | A | A | B |

TABLE 3

| | Example 8 | Comparative Example 5 |
|---|---|---|
| Hydrogenated block copolymer (A-1) | | |
| Hydrogenated block copolymer (A-2) | 100 | |
| Hydrogenated block copolymer (A-3) | | |
| Hydrogenated block copolymer (A-4) | | |
| Hydrogenated block copolymer (A'-1) | | 100 |
| Hydrogenated block copolymer (A'-2) | | |
| Polar group-containing polyolefin polymer (B-1) | 25 | 25 |
| Polar group-containing polyolefin polymer (B-2) | | |
| Polyvinyl acetal resin (C) | 19 | 19 |
| Softening agent (D) | | |

TABLE 3-continued

|  |  | Example 8 | Comparative Example 5 |
|---|---|---|---|
| Hardness | Type A | 43 | 72 |
| Melt viscosity | 1,210 s$^{-1}$ | 50 | 130 |
| Heat shrinkage factor | % | 7.1 | 11.2 |
| Aluminum | Peel strength (N/25 mm) | 89 | 50 |
|  | Fracture morphology | A | B |
| Glass | Peel strength (N/25 mm) | 151 | 53 |
|  | Fracture morphology | A | B |

TABLE 4

|  |  | Example 9 | Example 10 | Example 11 | Example 12 | Comparative Example 6 |
|---|---|---|---|---|---|---|
| Hydrogenated block copolymer (A-1) |  |  |  |  |  |  |
| Hydrogenated block copolymer (A-2) |  |  |  |  |  |  |
| Hydrogenated block copolymer (A-3) |  |  |  |  |  |  |
| Hydrogenated block copolymer (A-4) |  | 100 | 100 | 100 | 100 |  |
| Hydrogenated block copolymer (A'-1) |  |  |  |  |  |  |
| Hydrogenated block copolymer (A'-2) |  |  |  |  |  | 100 |
| Polar group-containing polyolefin polymer (B-1) |  | 50 | 25 | 75 | 200 | 50 |
| Polar group-containing polyolefin polymer (B-2) |  |  |  |  |  |  |
| Polyvinyl acetal resin (C) |  |  |  |  |  |  |
| Softening agent (D) |  | 100 | 100 | 200 | 250 | 100 |
| Hardness | Type A | 45 | 31 | 40 | 55 | 65 |
| Melt viscosity | 1,210 s$^{-1}$ | 57 | 35 | 29 | 45 | 78 |
| Heat shrinkage factor | % | 5.7 | 4.4 | 3.7 | 7.6 | Measurement impossible *) |
| Aluminum | Peel strength (N/25 mm) | 75 | 85 | 82 | 83 | 50 |
|  | Fracture morphology | A | A | A | A | B |
| Glass | Peel strength (N/25 mm) | 86 | 89 | 77 | 85 | 55 |
|  | Fracture morphology | A | A | A | A | B |
| PP | Peel strength (N/25 mm) | 80 | 82 | 82 | 88 | 54 |
|  | Fracture morphology | A | A | A | A | B |
| Nylon | Peel strength (N/25 mm) | 96 | 88 | 112 | 92 | 60 |
|  | Fracture morphology | A | A | A | A | B |

*) The sheet was melted during the measurement, so that the shape could not be kept.

In Table 2, in comparison of Examples 1 to 3 with Comparative Example 1, in which only the kind of the hydrogenated block copolymer is different, it is noted that Examples 1 to 3 each having the structural unit (b1) derived from farnesene are low in hardness, excellent in flexibility, low in melt viscosity, excellent in molding processability, and high in adhesive strength, are concerned with cohesive failure in the fracture morphology, and are excellent in adhesiveness, as compared with Comparative Example 1 using the hydrogenated block copolymer (A') not having the structural unit (b1) derived from farnesene. In addition, it is noted that in view of a small heat shrinkage factor, Examples 1 to 3 are also excellent in heat resistance.

In addition, in Table 2, in comparison of Examples 2 and 4 to 6 with Comparative Examples 2 to 4, in which the content of the polar group-containing olefin polymer (B) relative to hydrogenerated block copolymer (A) is different, Examples 2 and 4 to 6, in which the proportion of the polar group-containing olefinic polymer (B) falls within the scope of the present invention, are excellent in flexibility, molding processability, and adhesiveness. On the other hand, Comparative Examples 2 and 3, in which the proportion of the polar group-containing olefinic polymer (B) is more than the scope of the present invention, are inferior in flexibility and molding processability. In addition, Comparative Example 4, in which the proportion of the polar group-containing olefinic polymer (B) is less than the scope of the present invention, is inferior in adhesiveness.

In Table 3, Example 8 and Comparative Example 5 include the polyvinyl acetal resin (C) in the same composition, and the both are different only in the kind of the hydrogenated block copolymer. In comparison of Example 8 with Comparative Example 5, it is noted that Example 8 using the hydrogenated block copolymer (A) having the structural unit (b1) derived from farnesene is excellent in flexibility, molding processability, and adhesiveness, and in particular, is more improved in adhesive force to a glass, as compared with Comparative Example 5 using the hydrogenated block copolymer (A') not having the structural unit (b1) derived from farnesene. In addition, it is noted that in view of the fact that Example 8 is small in heat shrinkage factor, so that it is excellent in heat resistance.

In Table 4, Example 9 and Comparative Example 6 include the softening agent (D) in the same composition, and the both are different only in the kind of the hydrogenated block copolymer. In comparison of Example 9 with Comparative Example 6, Example 9 using the hydrogenated block copolymer (A) having the structural unit (b1) derived from farnesene is excellent in flexibility, molding processability, and adhesiveness, as compared with Comparative Example 6 using the hydrogenated block copolymer (A') not having the structural unit (b1) derived from farnesene. Furthermore, Example 9 was small in heat shrinkage factor and exhibited good heat resistance, whereas in Comparative Example 6, the sheet was melted during the measurement, and the measurement could not be performed. In addition, it is noted from the results of Examples 9 to 12 that even when the content of the softening agent (D) is changed over a wide range, the thermoplastic elastomer composition of the present invention is excellent in the aforementioned various performances.

The invention claimed is:

1. A thermoplastic elastomer composition, comprising:
    100 parts by mass of a hydrogenated block copolymer (A) comprising a polymer block (a) consisting of a structural unit derived from an aromatic vinyl compound and a polymer block (b) comprising 1 to 100% by mass of a structural unit (b1) derived from farnesene and comprising 99 to 0% by mass of a structural unit (b2) derived from a conjugated diene other than farnesene, wherein a mass ratio [(a)/(b)] of the polymer block (a) to the polymer block (b) is 1/99 to 70/30; and
    5 to 300 parts by mass of a polar group-containing olefinic polymer (B), wherein a proportion of a polar group-containing structural unit in the polar group-containing olefinic polymer (B) relative to total structural units is 0.01 to 10% by mass.

2. The thermoplastic elastomer composition according to claim 1, wherein the farnesene is β-farnesene.

3. The thermoplastic elastomer composition according to claim 1, wherein a hydrogenation rate of a carbon-carbon double bond in the polymer block (b) is 50 mol % or more.

4. The thermoplastic elastomer composition according to claim 1, wherein a peak top molecular weight (Mp) of the hydrogenated block copolymer (A) is 4,000 to 1,500,000.

5. The thermoplastic elastomer composition according to claim 1, wherein a molecular weight distribution (Mw/Mn) of the hydrogenated block copolymer (A) is 1 to 4.

6. The thermoplastic elastomer composition according to claim 1, wherein the aromatic vinyl compound is styrene.

7. The thermoplastic elastomer composition according to claim 1, wherein the polymer block (b) comprises the structural unit (b2) derived from the conjugated diene other than farnesene, which is at least one selected from the group consisting of isoprene, butadiene, and myrcene.

8. The thermoplastic elastomer composition according to claim 1, wherein the polar group-containing olefinic polymer (B) comprises at least one polar group selected from the group consisting of a (meth)acryloyloxy group, a hydroxyl group, an amide group, a halogen atom, a carboxyl group, and an acid anhydride group.

9. The thermoplastic elastomer composition according to claim 1, further comprising:
    a polyvinyl acetal resin (C) in a content of 0.1 to 100 parts by mass based on 100 parts by mass of the hydrogenated block copolymer (A).

10. The thermoplastic elastomer composition according to claim 9, wherein the polyvinyl acetal resin (C) is polyvinyl butyral.

11. The thermoplastic elastomer composition according to claim 1, further comprising:
    a softening agent (D) in a content of 0.1 to 300 parts by mass based on 100 parts by mass of the hydrogenated block copolymer (A).

12. An adhesive, comprising the thermoplastic elastomer composition according to claim 1.

13. A molded article, comprising the thermoplastic elastomer composition according to claim 1.

14. The molded article according to claim 13, wherein the thermoplastic elastomer composition is adhered to at least one selected from the group consisting of a ceramic, a metal, a polar resin, and a polyolefin resin.

15. The thermoplastic elastomer composition according to claim 1, wherein the proportion of the polar group-containing structural unit in the polar group-containing olefinic polymer (B) is 0.01 to 5% by mass.

16. The thermoplastic elastomer composition according to claim 1, wherein a melt flow rate of the polar group-containing olefinic polymer (B) measured at 230° C. and at a load of 21 N is 0.1 to 300 g/10 min.

17. The thermoplastic elastomer composition according to claim 1, wherein a hydrogenation rate of a carbon-carbon double bond in the polymer block (b) is 50 to 99.0 mol %.

* * * * *